United States Patent [19]
Brock

[11] Patent Number: 5,378,059
[45] Date of Patent: Jan. 3, 1995

[54] COMBINED ASPHALT PLANT AND SOIL REMEDIATION SYSTEM

[75] Inventor: J. Donald Brock, Chattanooga, Tenn.

[73] Assignee: Astec Industries, Inc., Chattanooga, Tenn.

[21] Appl. No.: 150,872

[22] Filed: Nov. 12, 1993

[51] Int. Cl.⁶ .............................................. B28C 5/20
[52] U.S. Cl. ............................................ 366/7; 366/25
[58] Field of Search .................. 366/4, 6, 7, 22, 23, 366/24, 25, 147, 1; 106/281.1, 273.1; 432/14, 15, 19

[56] References Cited

U.S. PATENT DOCUMENTS

| | | | |
|---|---|---|---|
| 3,999,743 | 12/1976 | Mendenhall | 366/4 |
| 4,867,572 | 9/1989 | Brock et al. | |
| 5,129,334 | 7/1992 | Mize | |
| 5,173,115 | 12/1992 | Glynn | 106/281.1 |
| 5,176,445 | 1/1993 | Mize | |
| 5,273,355 | 12/1993 | May et al. | |

Primary Examiner—Robert W. Jenkins
Attorney, Agent, or Firm—Nilles & Nilles

[57] ABSTRACT

An apparatus and method for heating and drying stone aggregate used in the production of asphalt, which also remediates and disposes of contaminated soil. Aggregate is introduced into a drum chamber of a fixed sleeve rotary drum mixer for heating. The aggregate is discharged into an annular chamber and mixed with contaminated soil that has been processed to be suitable for use in asphalt. As the soil is heated, the contaminants are vaporized and drawn into the drum chamber where they are oxidized by high temperature. Secondary aggregate in the form of recycled asphalt pavement (RAP) and/or virgin aggregate are also added to the annular chamber and mixed with the aggregate and soil to form asphalt and to cool the aggregate/soil mixture.

20 Claims, 2 Drawing Sheets

COMBINED ASPHALT PLANT AND SOIL REMEDIATION SYSTEM

BACKGROUND OF THE INVENTION

1. Field of the Invention

The present invention relates generally to the production of asphalt and soil remediation, and in particular, to a method and apparatus for remediating and disposing of contaminated soil.

2. Discussion of the Related Art

The disposal of soils which are contaminated with petroleum products, such as kerosine, gasoline or oil is an area of increasing environmental concern. The Environmental Protection Agency (EPA) has imposed increasingly strict regulations on the clean-up and disposal of contaminated soils.

A leaking underground fuel tank is a common form of the problem. Once a defective tank is removed, all of the surrounding contaminated soil must also be removed. This can involve the removal and disposal of thousands of tons of soil that have been contaminated. The alternative of disposing the contaminated soil into landfills is no longer as attractive due to decreasing landfill space and stricter EPA and state government regulations. Therefore, treatment of the contaminated soil is an increasingly more viable solution.

A common method of decontamination is to incinerate the soil. Various methods of soil incineration are known in the art. These methods often involve common components used by conventional asphalt production plants. However, incineration of the soil is not completely effective since the exposure of the soil to high temperature tends to produce large quantities of nitrogen oxides which are released into the atmosphere. In addition, a soil decontamination facility may not be as cost effective in all instances because the process produces only remediated soil which still must be discarded. Therefore, a need exists for a cost effective and efficient process to both remediate and dispose of contaminated soils.

U.S. Pat. No. 5,176,445 discloses an apparatus that resembles a conventional asphalt production plant. This apparatus can be retrofitted by the addition of a small number of additional components so as to permit the apparatus to selectively produce asphalt, or to decontaminate soil. However, this apparatus suffers from marked disadvantages. First, asphalt production and soil remediation cannot occur simultaneously. Only one process can be conducted at a given time. Second, after soil remediation, the decontaminated soil must still be discarded.

U.S. Pat. No. 5,129,334 discloses an apparatus for heating and drying stone aggregate useful in the production of asphalt, and which also has the ability to add incinerated soil directly into the aggregate. While this apparatus achieves an objective of disposing of the decontaminated soil into the asphalt, it suffers from several disadvantages.

For instance, the disclosed apparatus utilizes both a rotary drum to heat and dry the aggregate and a separate rotary incinerator for decontaminating soil. The use of two separate mechanisms increases the cost of operation and maintenance of an asphalt plant. In addition, the disclosed apparatus remediates soil by exposure to high temperature within the rotary incinerator, which produces high levels of pollutants which are released into the atmosphere.

Still other systems have been proposed to produce asphalt and remediate soil using a single drum mixer/dryer. Such systems subject contaminated soil to the heat from the burner flame before the flame enters the body of the mixer, thereby heating the soil. The soil and aggregate are then combined as they are discharged together from the mixer. Such systems are relatively inefficient because the heat of remediation comes not from the aggregate but from the flame. Imperfect mixing may also result because the aggregate and soil are combined for at most a brief period of time before being discharged from the mixer.

U.S. Pat. No. 4,867,572 discloses a fixed sleeve rotary drum mixer used in the production of asphalt. A drum mixer of this type contains a fixed sleeve that surrounds the lower portion of a rotating drum. Heated and dried aggregate that passes through the drum is then discharged into an annular chamber which is formed between the drum and sleeve. In some designs, an inlet is provided in the sleeve by which recycled asphalt pavement (RAP) may be introduced into the annular chamber. Another inlet may also be provided in the sleeve to introduce liquid asphalt. Mixing blades mounted on the drum within the annular chamber mix the materials and cause them to be moved towards a discharge outlet of the sleeve.

An advantage of a fixed sleeve rotary drum over other continuous-mix rotary drums involves the ability to introduce RAP directly into the annular chamber between the drum and sleeve. The RAP is heated by contact with the hot aggregate, by conductive heat transfer from the mixing blades mounted on the drum, and by radiant heat transfer from the shell of the drum within the annular chamber. This process sufficiently heats the asphalt contained in the RAP, yet shields the RAP from exposure to the high temperatures present within the drum, which can cause the RAP to smoke and burn. This process will also equally prevent the smoking and burning of liquid asphalt, which may be introduced into the annular chamber.

A further advantage of a fixed sleeve rotary drum is the ability to provide an apparatus for the production of asphalt which is inexpensive to manufacture and operate, and provides high thermal efficiency. However, while this apparatus achieves many advantages over others seen in the art, it suffers the distinct disadvantage of being unable to remediate soil.

SUMMARY OF THE INVENTION

An object of the present invention is to combine an asphalt plant utilizing a rotary drum mixer and system of remediating soil to provide an effective and efficient apparatus and method of producing asphalt and of remediating contaminated soil using heat from the asphalt aggregate.

It is a further object of the present invention to provide an apparatus and method for producing asphalt which utilizes remediated soil.

It is another object of the present invention to provide a method and apparatus which is inexpensive to manufacture and operate, and provides high thermal efficiency.

As will be seen, the present invention overcomes the disadvantages and problems associated with prior art methods and apparatus for producing asphalt and remediating soil. Stated generally, the present invention comprises a method and apparatus whereby contaminated soil is remediated and mixed with aggregate and possibly a secondary aggregate and liquid asphalt to form a paving composition asphalt.

More particularly, the present invention comprises a rotary drum having an interior drum chamber and preferably having a fixed sleeve which surrounds a lower portion of the drum to define an annular chamber therebetween. The drum is mounted for rotation about its longitudinal axis.

Typically, the drum is gas fired and stone aggregate is introduced into an inlet on an upper end of the drum. The aggregate is heated and dried while tumbling down the rotating drum until it is discharged from the lower portion of the drum into the annular chamber.

The contaminated soil may be stored in a bin until the remediating process begins. The soil passes through a scalping screen to remove oversized material or debris. The soil is moved along a conveyor where it may pass a magnet which removes metal objects from the soil, such as nails and metal fragments. The soil is then passed through a crusher of the type similarly used to break apart RAP. A vibrating screen is used to separate properly sized particles of soil from large unacceptable particles, which are returned to the crusher. The properly sized particles of soil are introduced into the annular chamber.

Mixing blades or flights mounted to the exterior of the drum within the annular chamber mix the heated and dried aggregate with the contaminated soil. The soil is heated by contact with the aggregate, by conductive heat transfer from the mixing blades mounted on the drum, and by radiant heat transfer from the shell of the drum within the annular chamber. As the soil is heated to a point above the vaporization temperature and below the autoignition temperature, the contaminants from the soil are vaporized. The vaporized contaminants are then drawn into the drum chamber and oxidized by the high temperature within the drum.

Secondary aggregate (RAP and/or additional virgin aggregate) and liquid asphalt may also be introduced into the annular chamber to be heated and mixed with the aggregate and soil. Because the secondary aggregate and liquid asphalt are shielded from exposure to the high temperatures present within the drum, smoking and burning are prevented. The resulting mixture is moved along the annular chamber and discharged from an outlet of the sleeve.

A baghouse is used to collect and clean discharged vapors from the drum before entering the atmosphere. The particles collected may then be fed back into the annular chamber to be mixed with the aggregate and other components to create asphalt. A cyclone separator may also be utilized to remove larger particles before entering the baghouse.

DETAILED DESCRIPTION OF PREFERRED EMBODIMENT

Figure 1:
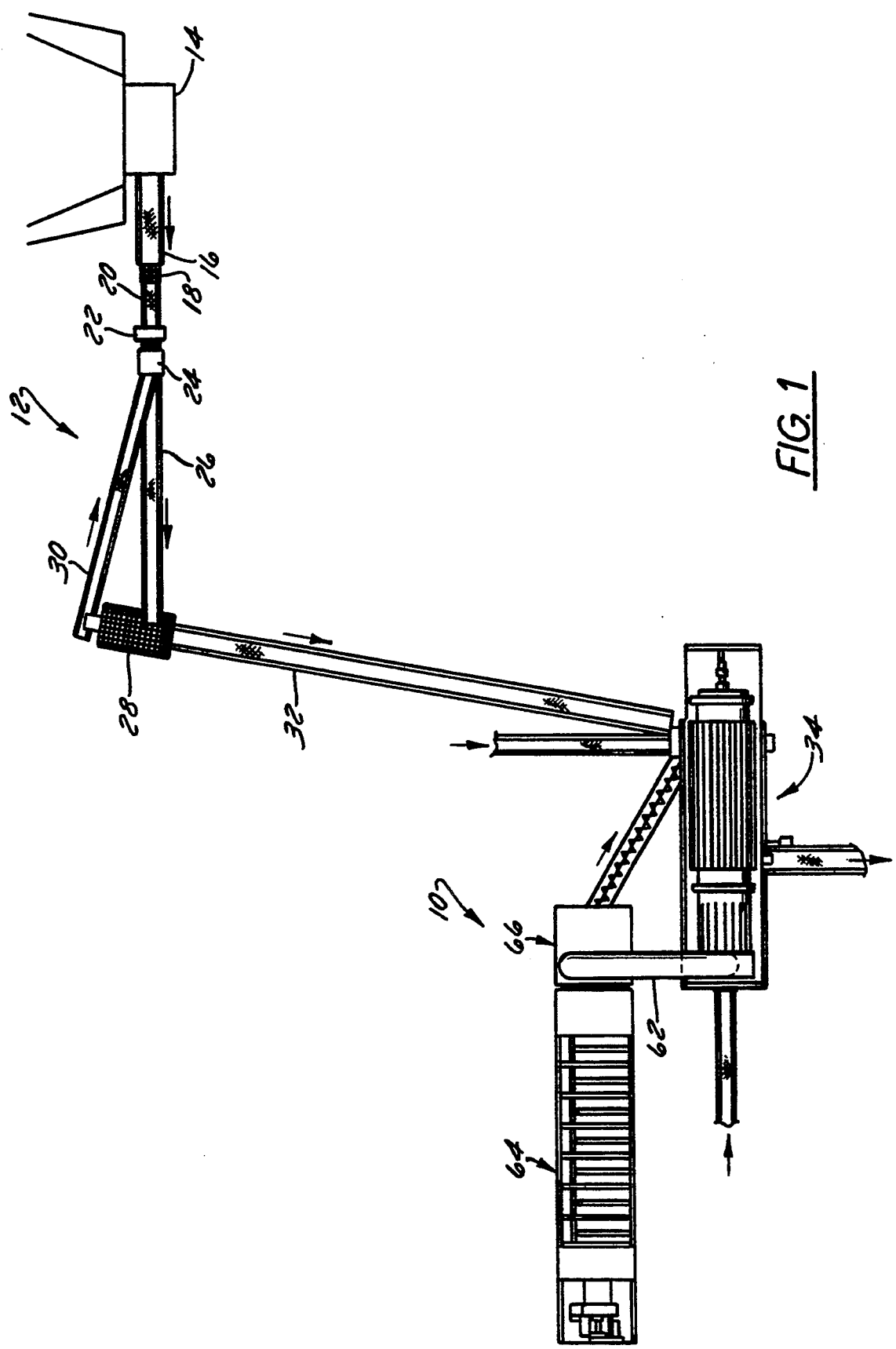
FIG. 1 is a top plan view of a combined asphalt plant and soil remediation system having an attached contaminated soil processing apparatus constructed in accordance with a preferred embodiment of the invention.

Referring to the drawings, FIG. 1 illustrates a continuous mix asphalt plant 10 including a contaminated soil processing apparatus 12. The soil processing apparatus 12 stores contaminated materials, sizes and grades the materials for further processing in the asphalt plant 10, and feeds the contaminated materials to the asphalt plant 10. The asphalt plant 10 produces an asphalt mix, remediates contaminated materials, and disposes of the remediated materials in the asphalt mix. The contaminated materials typically comprise soil contaminated with petroleum or other volatile hydrocarbons but may comprise any materials which 1) can be remediated through heating and 2) are suitable for use in an asphalt mix after remediation.

The contaminated soil processing apparatus 12 comprises a contaminated soil bin 14 of conventional design which stores the contaminated soil until feeding the soil onto a first conveyor 16 which leads to a scalping screen 18. The scalping screen 18 scalps off oversized material or debris. A second conveyor 20 has an inlet connected to the scalping screen 18 and conveys the soil past a magnet 22 which removes metal objects from the soil, such as nails and metal fragments. The soil is then processed by a conventional RAP crusher 24 which crushes the soil into particles suitable for use in asphalt. This is especially necessary when materials such as rock and clay are disposed in the soil.

A third conveyor 26 feeds the soil processed by the RAP crusher 24 onto a vibrating screen 28 which separates particles suitable for use in asphalt from oversized particles. Particles less than $\frac{1}{4}''$ to $\frac{5}{8}''$ are generally suitable. Oversized particles are returned to the RAP crusher 24 by a fourth conveyor 30 having an inlet communicating with a discharge end of screen 28. The soil particles of suitable size, having fallen through the screen 28, are then transported by a fifth conveyor 32 for introduction into a fixed sleeve rotary drum mixer 34.

Figure 2:
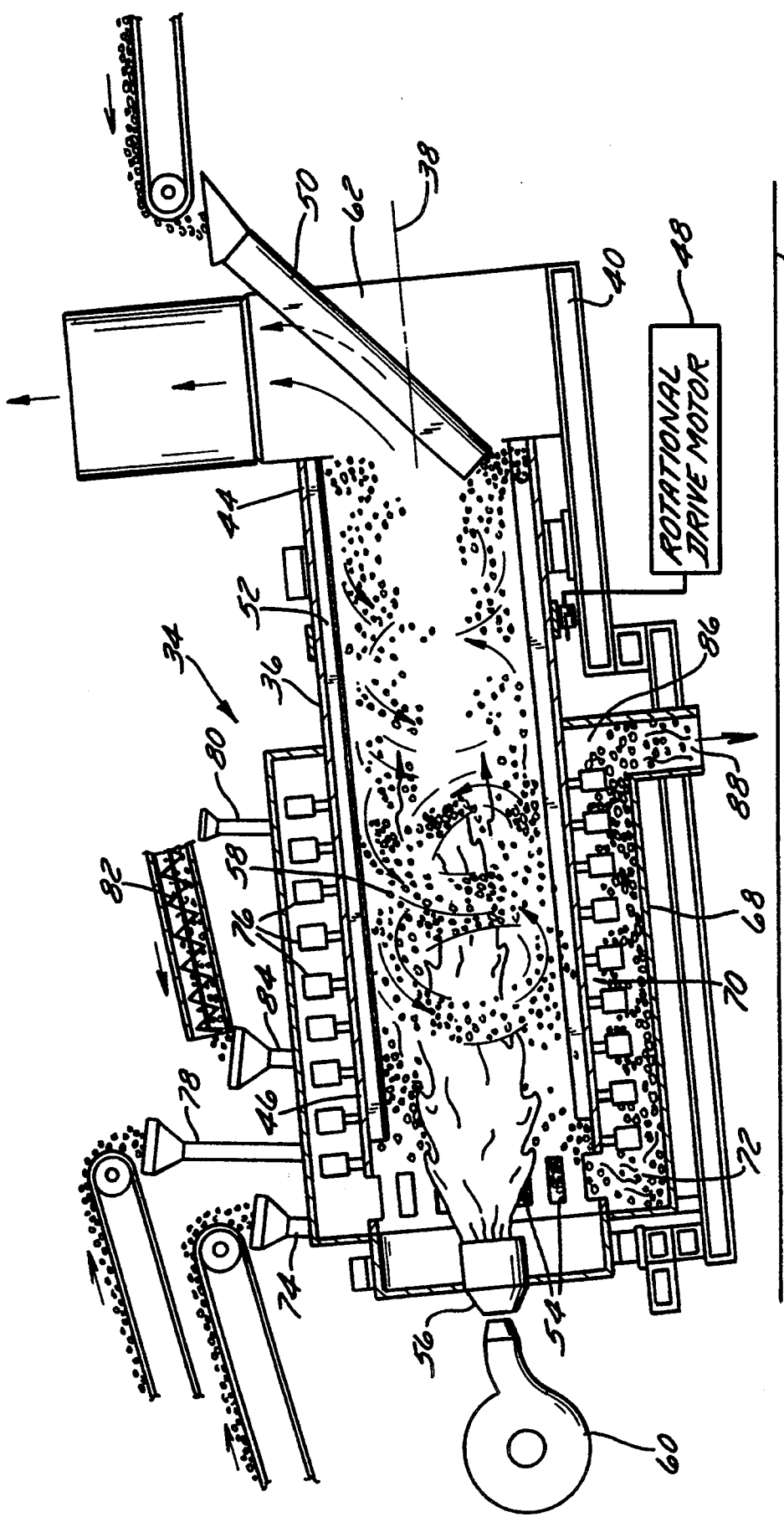
FIG. 2 is a partially sectioned side elevation view of a fixed sleeve rotary drum mixer usable in the plant of FIG. 1.

In a preferred embodiment, a fixed sleeve rotary drum mixer 34 is utilized. However, other rotary drum mixers of conventional design may be implemented, so long as a suitable mixture is employed in conjunction with the rotary drum mixer to mix the aggregate with soil so as to remediate the soil with heat from the aggregate while simultaneously producing an asphalt mixture. As indicated in FIG. 2, the fixed sleeve rotary drum mixer 34 comprises an elongate hollow drum 36 which defines a central axis 38. The drum 36 is rotatably mounted on a frame 40 so that the central axis 38 is inclined with respect to the horizontal 42, creating an upper drum end 44 and a lower drum end 46. A rotational drive motor 48, shown schematically, is of conventional design well known to those skilled in the art.

In use, aggregate is introduced into the drum 36 at the upper drum end 44 through an aggregate inlet chute 50. A plurality of flights or vanes 52 are mounted on the inside of the drum for tumbling the aggregate and moving it towards a plurality of drum outlet openings 54 located at lower drum end 46. A burner 56 is mounted at the lower drum end 46 for directing a high temperature flame into an interior drum chamber 58. The burner 56 is of conventional design and well known to those skilled in the art. A blower 60 charges a mixture of fuel into the burner 56, where it is ignited to produce a flame for heating the interior drum chamber 58.

An exhaust duct 62 is attached at the upper drum end 44 for exhausting vapors from within the interior drum chamber 58. A filtering baghouse 64, as seen in FIG. 1, communicates with the exhaust duct 62 for filtering the exhausted vapors before being released into the atmosphere. A cyclone separator 66 may be also positioned to communicate with the exhaust duct 62 to remove larger particles from the exhausted vapors. Both the baghouse 64 and cyclone separator 66 are of conventional design and well known to those skilled in the art.

As best illustrated in FIG. 2, the fixed sleeve rotary drum mixer 34 further comprises a fixed sleeve 68 which is mounted coaxially about the lower drum end 46 of drum 36. The drum 36 and fixed sleeve 68 define an annular chamber 70 therebetween. Heated and dried aggregate in the lower drum end 46 falls through the drum outlet openings 54 into a lower annular chamber end 72 of the annular chamber 70 during rotation of the drum 36.

In operation, the contaminated soil transported by the fifth conveyor 32 will enter into the lower annular chamber end 72 of the annular chamber 70 through a soil inlet 74. A plurality of mixing blades 76, mounted on the outer circumference of the drum 36 within the annular chamber 70, mix the heated and dried aggregate with the contaminated soil.

The soil is heated by contact with the aggregate, by conductive heat transfer from the mixing blades 76, and by radiant heat transfer from the drum 36. As the soil is heated to a point above the vaporization temperature and below the autoignition temperature, the contaminants from the soil are vaporized. Generally, this will be at a temperature between 450° and 700° F. The vaporized contaminants are then drawn into the drum 36 through the drum outlet openings 54 by the pressures created by the blower 60 and exhaust duct 62. The vaporized contaminants are then oxidized by the high temperature within the interior drum chamber 58. Generally, this will involve temperatures between 1200° and 1800° F. Thus, the soil is remediated without actually exposing the soil to high temperatures.

In the illustrated embodiment, a secondary inlet 78, located on the fixed sleeve 68, allows the introduction of RAP and/or another secondary aggregate such as additional virgin aggregate into the annular chamber 70. A supply pipe 80 communicating with the fixed sleeve 68 allows the introduction of liquid asphalt into the annular chamber 70. The secondary aggregate and liquid asphalt are heated and mixed with the aggregate and soil in the annular chamber 70. Because the secondary aggregate and liquid asphalt are shielded from exposure to the high temperatures present within the interior drum chamber 58, smoking and burning is prevented. Feeding a controlled percentage of aggregate into inlet 78 also serves to cool the aggregate for reasons detailed below.

In a preferred embodiment, a dust screw 82 from the baghouse 64 attaches to the fixed sleeve 68 at a dust inlet 84. This allows the dust particles collected by the baghouse 64 and cyclone separator 66 to be introduced into the annular chamber 70 and remediated. The dust particles are then mixed with the aggregate, soil, secondary aggregate, and liquid asphalt to produce asphalt that is discharged at an upper annular chamber end 86 through a discharge opening 88 of the fixed sleeve 68.

The operation of the mixer 34 should be controlled that the asphalt is discharged from opening 88 at a temperature of about 300° F. However, because the contaminated soil must be heated to about 400° F.–700° F. for remediation, the aggregate must be overheated in chamber 58 to about 600° F.–800° F. to provide adequate heat for soil remediation in annular chamber 70. The resulting mixture, which is too hot for immediate use as a paving material, is cooled by feeding secondary aggregate into inlet 78 at a relatively low temperature of, e.g., 70° F. to cool the resultant mixture to about 300° F. The amount of secondary aggregate fed into inlet 78 increases with the temperature of the aggregate entering the chamber 70 from the chamber 58. When aggregate is heated to 600° F.–800° F. in the chamber 58, the relative percentages of the mix components are controlled such that mixture discharged from outlet 88 typically includes 50–70% virgin aggregate from inlet 50, about 5% contaminated soil from inlet 74, and about 25–45% secondary aggregate from inlet 78. (The percentage of dust added via opening 84 is negligible compared to those of the remaining components). It can thus be seen that overheating the aggregate in chamber 58 does not significantly reduce the efficiency of the drying process since the excess energy is ultimately used to heat the remainder or the mixture to the desired temperature.

The present invention affords a number of advantages over prior art asphalt plants and soil remediation systems. By incorporating the remediated soil into the asphalt, separate asphalt and soil remediation plants need not be provided. The present invention also reduces the components and steps used in prior art combination asphalt and soil remediation plants. A separate rotary drum for heating and drying aggregate and rotary incinerator for decontaminating soil is not needed by utilizing a single fixed sleeve rotary drum. Of course, the fixed sleeve and associated annular chamber could, if desired, be replaced with an separate mixer such as a pugmill.

Yet another feature of the present invention is the protection of the contaminated soil from exposure to the high temperatures within the drum when a fixed sleeve rotary drum mixer is employed. This reduces pollution and avoids sterilization of the organic compounds within the soil. The contaminants are vaporized from the soil within the annular chamber. Those vaporized gases are then oxidized by the high temperatures within the drum, further reducing pollution and providing an efficient and cost effective method of soil remediation.

It should be understood that the foregoing relates to preferred embodiments of the present invention and modifications or alterations may be made without departing from the scope of the invention as set forth in the claims.

I claim:
1. An asphalt plant comprising:
  a. a rotary drum mixer having first and second inlets and an outlet;
  b. means for introducing aggregate into the first inlet of the rotary drum mixer;
  c. means for heating the rotary drum mixer;
  d. means for introducing a solid contaminated material into the second inlet of the rotary drum mixer;
  e. means for mixing the aggregate and the solid contaminated material, so as to remediate the solid contaminated material using heat from said aggregate and so as to form a mixture of the aggregate and solid contaminated material; and f. means for discharging the mixture from the outlet of the rotary drum mixer.

2. The asphalt plant of claim 1, further comprising means for processing the solid contaminated material for remediation before introduction into the rotary drum mixer.

3. The asphalt plant of claim 1, wherein the means for heating and the means for mixing produces vapors and particulates within the vapors, and the asphalt plant further comprises means for cleaning the particulates from the vapors withdrawn from the rotary drum mixer and introducing these particulates into the rotary drum mixer.

4. The apparatus of claim 1, further comprising means for introducing secondary aggregate into the rotary drum mixer.

5. The apparatus of claim 4, wherein said secondary aggregate comprises recycled asphalt pavement (RAP).

6. The apparatus of claim 1, wherein the rotary drum mixer is a fixed sleeve rotary drum mixer.

7. An asphalt plant comprising;
   a. a rotary drum mixer having first and second inlets and an outlet;
   b. means for introducing aggregate into the first inlet of the rotary drum mixer:
   c. means for heating the rotary drum mixer;
   d. means for introducing a solid contaminated material into the second inlet of the rotary drum mixer;
   e. means for mixing the aggregate and the solid contaminated material, so as to remediate the solid contaminated material using heat from said aggregate and so as to form a mixture of the aggregate and solid contaminated material;
   f. means for discharging the mixture from the outlet of the rotary drum mixer; and
   g. means for processing the solid contaminated material for remediation before introduction into the rotary drum mixer,
   wherein the means for processing the solid contaminated material includes means for crushing and screening of the solid contaminated material into particles of no greater size than five-eighths of an inch.

8. An apparatus for producing asphalt, which also remediates a solid contaminated material and forms a mixture with the solid contaminated material, comprising:
   a. a fixed sleeve rotary drum mixer having a drum chamber and an annular chamber;
   b. means for introducing aggregate into the drum chamber;
   c. means for heating the drum chamber in order to heat and dry the aggregate;
   d. means for discharging the aggregate into the annular chamber;
   e. means for introducing the solid contaminated material into the annular chamber;
   f. means tier mixing the aggregate and the solid contaminated material within the annular chamber; and
   g. means for discharging the mixture of aggregate and solid contaminated material from the annular chamber.

9. The apparatus of claim 8, further comprising means for crushing and screening of the solid contaminated material into particles of no greater size than five-eighths of an inch before the solid contaminated material is introduced into the annular chamber.

10. The apparatus of claim 8, further comprising means for introducing a secondary aggregate and liquid asphalt into the annular chamber for mixing.

11. An apparatus for producing asphalt, which also remediates a solid contaminated material and forms a mixture with the solid contaminated material, comprising:
    a. a fixed sleeve rotary drum mixer having a drum chamber and an annular chamber;
    b. means for introducing aggregate into the drum chamber;
    c. means for heating the drum chamber in order to heat and dry the aggregate;
    d. means for discharging the aggregate into the annular chamber;
    e. means for introducing the solid contaminated material into the annular chamber;
    f. means for mixing the aggregate and the solid contaminated material within the annular chamber; and
    g. means for discharging the mixture of aggregate and solid contaminated material from the annular chamber,
    wherein the means for heating and the means for mixing produces vapors and particulates within the vapors, and the apparatus further comprises means for cleaning the particulates from the vapors withdrawn from the drum chamber and introducing these particulates into the annular chamber.

12. A method of producing asphalt, remediating a solid contaminated material, and adding the solid contaminated material into a mixture, comprising the steps of:
    a. feeding a stone aggregate into a drum chamber of a rotary drum mixer
    b. heating and drying the stone aggregate in the drum chamber;
    c. feeding the solid contaminated material into the rotary drum mixer; and
    d. mixing the solid contaminated material and aggregate in the rotary drum mixer in order to remediate the solid contaminated material using heat from said aggregate and form a mixture suitable for use as asphalt.

13. The method of claim 12, further comprising the step of processing the contaminated material for remediation before introduction into the annular chamber.

14. A method of producing asphalt, remediating a solid contaminated material, and adding the solid contaminated material into a mixture, comprising the steps of:
    a. feeding a stone aggregate into a drum chamber of a rotary drum mixer
    b. heating and drying the stone aggregate in the drum chamber;
    c. feeding the contaminated material into the rotary drum mixer; and
    d. mixing the contaminated material and aggregate in the rotary drum mixer in order to remediate the contaminated material using heat from said aggregate and to form a mixture suitable for use as asphalt,
    further comprising the step of feeding a secondary aggregate into said rotary drum mixer and mixing said secondary aggregate with said solid contaminated material and said aggregate, and wherein said mixture is discharged from said rotary mixer at a temperature of about 300° F. and includes about 50–70% aggregate, about 5% material, and about 25–45% secondary aggregate.

15. A method of producing asphalt, remediating a solid contaminated material, and adding the solid contaminated material into a mixture, comprising the steps of:
   a. heating and drying stone aggregate in a drum chamber of a fixed sleeve rotary drum mixer;
   b. introducing the solid contaminated material into an annular chamber of the fixed sleeve rotary drum mixer; and
   c. mixing the contaminated material and aggregate in the annular chamber in order to remediate the solid contaminated material and form a mixture suitable for use as asphalt.

16. The method of claim 15, further comprising the step of processing the solid contaminated material for remediation before introduction into the annular chamber.

17. The method of claim 15, wherein the step of heating and drying and the step of mixing produces vapors and particulates within the vapors, and the method further comprises the step of cleaning the particulates from the vapors withdrawn from the drum chamber and the step of introducing these particulates into the annular chamber.

18. The method of claim 15, further comprising the step of introducing a secondary aggregate and liquid asphalt into the annular chamber for mixing.

19. The method of claim 15, wherein the step of mixing the solid contaminated material and aggregate includes vaporizing solid contaminates from the contaminated material within the annular chamber, drawing the contaminates into the drum chamber, and oxidizing the contaminates within the drum chamber.

20. A method of producing asphalt, remediating a solid contaminated material, and adding the solid contaminated material into a mixture, comprising the steps of:
   a. heating and drying stone aggregate in a drum chamber of a fixed sleeve rotary drum mixer;
   b. introducing the solid contaminated material into an annular chamber of the fixed sleeve rotary drum mixer; and
   c. mixing the solid contaminated material and aggregate in the annular chamber in order to remediate the solid contaminated material and form a mixture suitable for use as asphalt,
   wherein the step of mixing the solid contaminated material and aggregate includes vaporizing contaminates from the solid contaminated material within the annular chamber, drawing the contaminates into the drum chamber, and oxidizing the contaminates within the drum chamber, and
   wherein the contaminates are vaporized within the annular chamber at a temperature between 450° and 700° F., and vaporized contaminates within the drum chamber are oxidized at a temperature between 1200° and 1800° F.

* * * * *

UNITED STATES PATENT AND TRADEMARK OFFICE
CERTIFICATE OF CORRECTION

PATENT NO. : 5,378,059
DATED : Jan. 3, 1995
INVENTOR(S) : Brock

It is certified that error appears in the above-indentified patent and that said Letters Patent is hereby corrected as shown below:

Column 7, line 58, "tier" should be --for--.

Signed and Sealed this

Eighth Day of August, 1995

Attest:

BRUCE LEHMAN

*Attesting Officer*     *Commissioner of Patents and Trademarks*